(12) United States Patent
Wei et al.

(10) Patent No.: US 11,341,424 B2
(45) Date of Patent: May 24, 2022

(54) METHOD, APPARATUS AND SYSTEM FOR ESTIMATING CAUSALITY AMONG OBSERVED VARIABLES

(71) Applicant: NEC CORPORATION, Tokyo (JP)

(72) Inventors: Wenjuan Wei, Beijing (CN); Chunchen Liu, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 528 days.

(21) Appl. No.: 16/220,204

(22) Filed: Dec. 14, 2018

(65) Prior Publication Data
US 2019/0318256 A1    Oct. 17, 2019

(30) Foreign Application Priority Data
Apr. 16, 2018  (CN) .......................... 201810338823.3

(51) Int. Cl.
| | | |
|---|---|---|
| *G06G 7/62* | (2006.01) | |
| *G06Q 30/02* | (2012.01) | |
| *G06Q 30/00* | (2012.01) | |
| *G06N 5/02* | (2006.01) | |
| *G06N 5/04* | (2006.01) | |
| *G06F 16/31* | (2019.01) | |
| *G06N 7/00* | (2006.01) | |

(Continued)

(52) U.S. Cl.
CPC ........... *G06N 5/046* (2013.01); *G06F 16/313* (2019.01); *G06F 16/9024* (2019.01); *G06N 5/006* (2013.01); *G06N 5/022* (2013.01); *G06N 7/005* (2013.01)

(58) Field of Classification Search
CPC ........ G06N 5/046; G06N 5/022; G06N 7/005; G06N 5/006; G06N 20/00; G06N 5/04; G06F 16/313; G06F 16/9024

USPC ....................................................... 706/1–62
See application file for complete search history.

(56) References Cited

U.S. PATENT DOCUMENTS

| | | | |
|---|---|---|---|
| 10,311,442 B1 * | 6/2019 | Lancaster | .............. G06Q 30/00 |
| 10,817,794 B1 * | 10/2020 | Chattopadhyay | ....... G06F 9/542 |
| 2007/0156382 A1 | 7/2007 | Graham et al. | |

(Continued)

FOREIGN PATENT DOCUMENTS

| | | |
|---|---|---|
| JP | 2009-522657 A | 6/2009 |
| JP | 2014-228991 A | 12/2014 |

OTHER PUBLICATIONS

Office Action dated Jul. 27, 2021 in Japanese Application No. 2020-127265.

*Primary Examiner* — Brandon S Cole
(74) *Attorney, Agent, or Firm* — Sughrue Mion, PLLC

(57) ABSTRACT

In response to receiving observed data of mixed observed variables, a mixed causality objective function, being suitable for continuous observed variables and discrete observed variables is determined, wherein the mixed causality objective function includes a causality objective function for continuous observed variables and a causality objective function for discrete observed variables and the fitting inconsistency is adjusted based on weighted factors of the observed variables. Then, the mixed causality objective function is optimally solved by using a mixed sparse causal inference, suitable for both continuous observed variables and discrete observed variables, using the mixed observed data under a constraint of a directed acyclic graph, to estimate causality among the observed variables.

18 Claims, 8 Drawing Sheets

(51) Int. Cl.
*G06F 16/901* (2019.01)
*G06N 5/00* (2006.01)

(56) References Cited

U.S. PATENT DOCUMENTS

| | | | | |
|---|---|---|---|---|
| 2009/0271342 A1* | 10/2009 | Eder | ...................... | G16H 50/50 |
| | | | | 706/20 |
| 2010/0198761 A1* | 8/2010 | Meng | ...................... | G06N 7/005 |
| | | | | 706/12 |
| 2012/0010867 A1* | 1/2012 | Eder | ...................... | G16H 50/50 |
| | | | | 703/13 |
| 2016/0196587 A1* | 7/2016 | Eder | .................. | G06Q 30/0276 |
| | | | | 705/14.49 |
| 2019/0318256 A1* | 10/2019 | Wei | ........................ | G06N 5/046 |

* cited by examiner

Fig.6 A
Fig.6 B
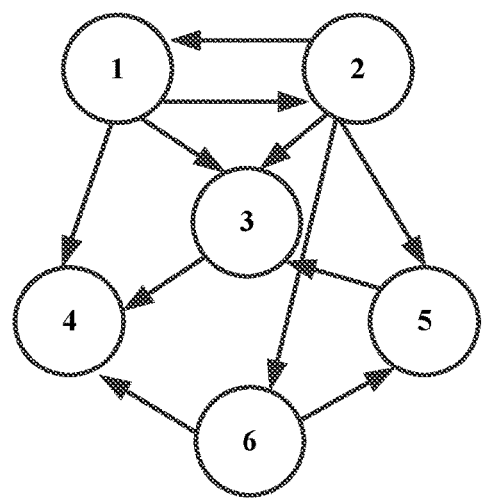
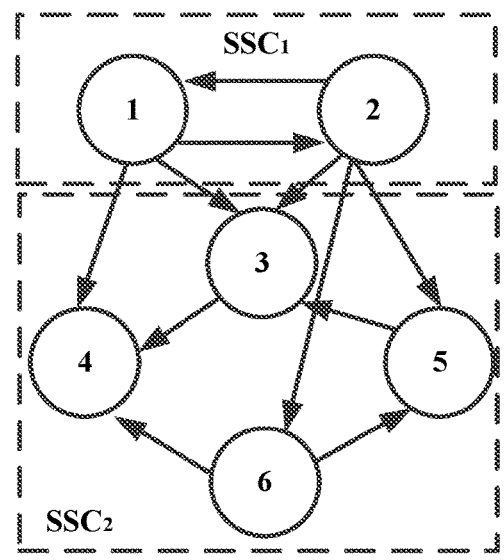
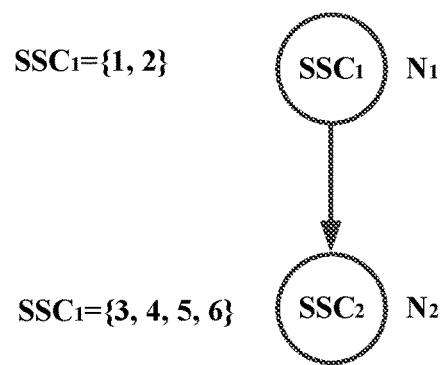
Fig.6 C

METHOD, APPARATUS AND SYSTEM FOR ESTIMATING CAUSALITY AMONG OBSERVED VARIABLES

FIELD

The present disclosure relates to the technology field of data mining, and more particularly to a method, apparatus and system for estimating causality among observed variables.

BACKGROUND

In the big data era, massive data can be gathered through various approaches of data acquisition and a lot of useful information can be obtained through analyzing and mining the data. However, in many application fields, people often see the superficial aspect of a system only and have no thorough insight into complex mechanism of actions and processes behind the system. Mostly, people can only have an understanding of the complex mechanism from experiences.

Causal structure learning is dedicated to automatically learn, based on observed data of the system, the complex mechanism of the system and recover the data generation process. At present, the causal structure learning technology has been applied into many fields, such as pharmaceuticals, manufacturing, market analysis and the like, so as to have an insight into the nature of the system and further make a decision and create values.

Observed variables in the datasets can be of different data types, such as continuous variables or discrete variables. However, in actual practice, datasets routinely collected are multi-modal, that is, a dataset is usually comprised of a mixture of continuous variables and discrete variables rather than a single type of variables. In the current causal structure learning, the common models include structural equation model, Bayesian network causal model and the like. However, those common causal structure learning models mainly focus on single modal datasets and the performance of those models for mixed datasets is unsatisfactory.

The structural equation model is a popular method for the causal structure learning, and, for example, LiNGAM model, CAM model, ANM model and the like all belong to the structural equation model. However, analysis those models is used for continuous variables or discrete variables and none of the existing related models works well in case of co-existence of continuous variables and discrete variables.

Bayesian network causal model is another widely applied method. A traditional Bayesian causal learning supports a high precision solving of the causal structure with an accurate inference algorithm. The traditional Bayesian network causal model, when processing mixed variables, usually employs continuous variable discretization, data type conversion based on conditional probability distribution, and the methods based on conditional independence test. However, all of the above methods have some issues. In the method of continuous variable discretization, the continuous variables will be converted into discrete variables, but the discretization of the continuous variables can cause the loss of partial information of the continuous variables, which accordingly raises precision issue. The method of data type conversion based on conditional probability distribution will convert conditional probability distribution of continuous variables and discrete variables into the same data type; however, such a method has a high time complexity and cannot be used for a high dimensional complicated causal structure learning task due to a large amount of conversions. In addition, the method based on conditional independence test can only determine an equivalence class of the network structure and fails to fully determine the specific causality in the network.

Furthermore, there is proposed a method of causal inference using A*Lasso algorithm in *A*Lasso for Learning a Sparse Bayesian Network Structure for Continuous Variables*, by Jing Xiang and Seyoung Kim et al. As shown in FIG. 1, in the proposed solution, it receives observed data first and then models a sparse causal structure based on the fitting inconsistency upon fitting the data and sparsity constraints, and executes causal inference with A*Lasso search. Additionally, the solution also reduces a search space searched by an optimal causal sequence by setting a threshold value of the number of candidate causal sequences, to accelerate causal inference.

However, the existing sparse causal modeling method is mainly directed at datasets in which all of the variables are continuous variables or discrete variables. However, for datasets in which continuous variables and discrete variables co-exist, the existing causal model or inference algorithm either cannot support high-dimensional complicated causal structure learning of the observed variables due to the high time complexity, thus could decrease the precision of the causal structure learning because the result learned based on continuous variable discretization and conditional independence determination is not optimal.

Hence, a new solution of estimating causality among observed variables in the context of mixed variables is required in the art.

SUMMARY

In view of this, the present disclosure presents a method, apparatus and system for estimating causality among observed variables to at least partially eliminate or alleviate the problems in the art.

According to a first aspect of the present disclosure, there is provided a method for estimating causality among observed variables. In the method, in response to receiving observed data of mixed observed variables, a mixed causality objective function suitable for continuous observed variables and discrete observed variables can be determined based on fitting inconsistency upon fitting the data and sparsity constraints on a causal network structure for the observed variables. Particularly, the mixed causality objective function includes a causality objective function for continuous observed variables and a causality objective function for discrete observed variables, wherein the fitting inconsistency is adjusted based on weighted factors of the observed variables, a weighted factor of an observed variable represents a lower limit of a minimum cost required for fitting an object variable using other observed variables than the observed variable, and weighted factors for the discrete observed variables are different from weighted factors for the continuous observed variables. Afterwards, a mixed causality objective function for the multiple observed variables can be optimally solved by means of a mixed sparse causal inference, which is suitable for both continuous observed variables and discrete observed variables, using the mixed observed data under a constraint of directed acyclic graph, to estimate causality among the multiple observed variables.

According to a second aspect of the present disclosure, there is provided an apparatus for estimating causality among observed variables. The apparatus can comprise: a mixed objective function determination module and a mixed causal inference module. The mixed objective function determination module can be configured to: in response to receiving observed data of mixed observed variables, determine, based on fitting inconsistency upon fitting the data and sparsity constraints on a causal network structure for the observed variables, a mixed causality objective function suitable for continuous observed variables and discrete observed variables. In particular, the mixed causality objective function includes a causality objective function for continuous observed variables and a causality objective function for discrete observed variables, wherein the fitting inconsistency is adjusted based on weighted factors of the observed variables, a weighted factor of a observed variable represents a lower limit of a minimum cost required for fitting an object variable using other observed variables than the observed variable, and weighted factors for the discrete observed variables are different from weighted factors for the continuous observed variables. The mixed causal inference module can be configured to optimally solve a mixed causality objective function for the multiple observed variables by means of a mixed sparse causal inference suitable for both continuous observed variables and discrete observed variables, using the observed data under a constraint of directed acyclic graph, to estimate causality among the multiple observed variables.

According to a third aspect of the present disclosure, there is provided a system for estimating causality among observed variables. The system can comprise of a processor and a memory having one or more computer program codes stored thereon, the computer program codes, when executed by the processor, triggering the processor to perform steps of the method according to the first aspect of the present disclosure.

According to a fourth aspect of the present disclosure, there is provided a computer-readable storage medium having computer program codes stored thereon, the computer program codes, when executed by a processor, triggering a computing device to perform actions of the method according to the first aspect of the present disclosure.

According to a fifth aspect of the present disclosure, there is provided computer program product having computer program codes stored thereon, the computer program codes, when loaded into a computer device, triggering the computing device to perform actions of the method according to the first aspect of the present disclosure.

With embodiments of the present disclosure, a mixed causality objective function, including both a causality objective function for discrete observed variables and a causality objective function for continuous observed variables, is built for observed data of mixed observed variables. Besides, fitting inconsistency is adjusted via weighted factors of the observed variables and the mixed sparse causal inference is employed in the inference process. Accordingly, the solution of estimating causality among observed variables proposed in embodiments of the present disclosure is suitable for causality estimation in the context of mixed observed data, and the causal network structure is less sensitive to the estimate errors of the observed variables, so a more precise causality can be acquired. Furthermore, as further described in the following description, pruning of the search space also can be performed using a search space pruning technology based on sequential relations of variable groups, to accelerate and optimize a solution to the problem.

BRIEF DESCRIPTION OF THE DRAWINGS

Through the following detailed description of illustrated embodiments with reference to the accompanying drawings, the above and other features of the present disclosure will become more apparent. Same reference signs in the drawings of the present disclosure represent same or similar elements. In the drawings:

FIGS. 6A-6C schematically illustrate an example parent relation graph, strongly connected components and new directed acyclic graph in a process of generating a sequential relation of variable groups according to an embodiment of the present disclosure;

DETAILED DESCRIPTION OF EMBODIMENTS

Figure 1:
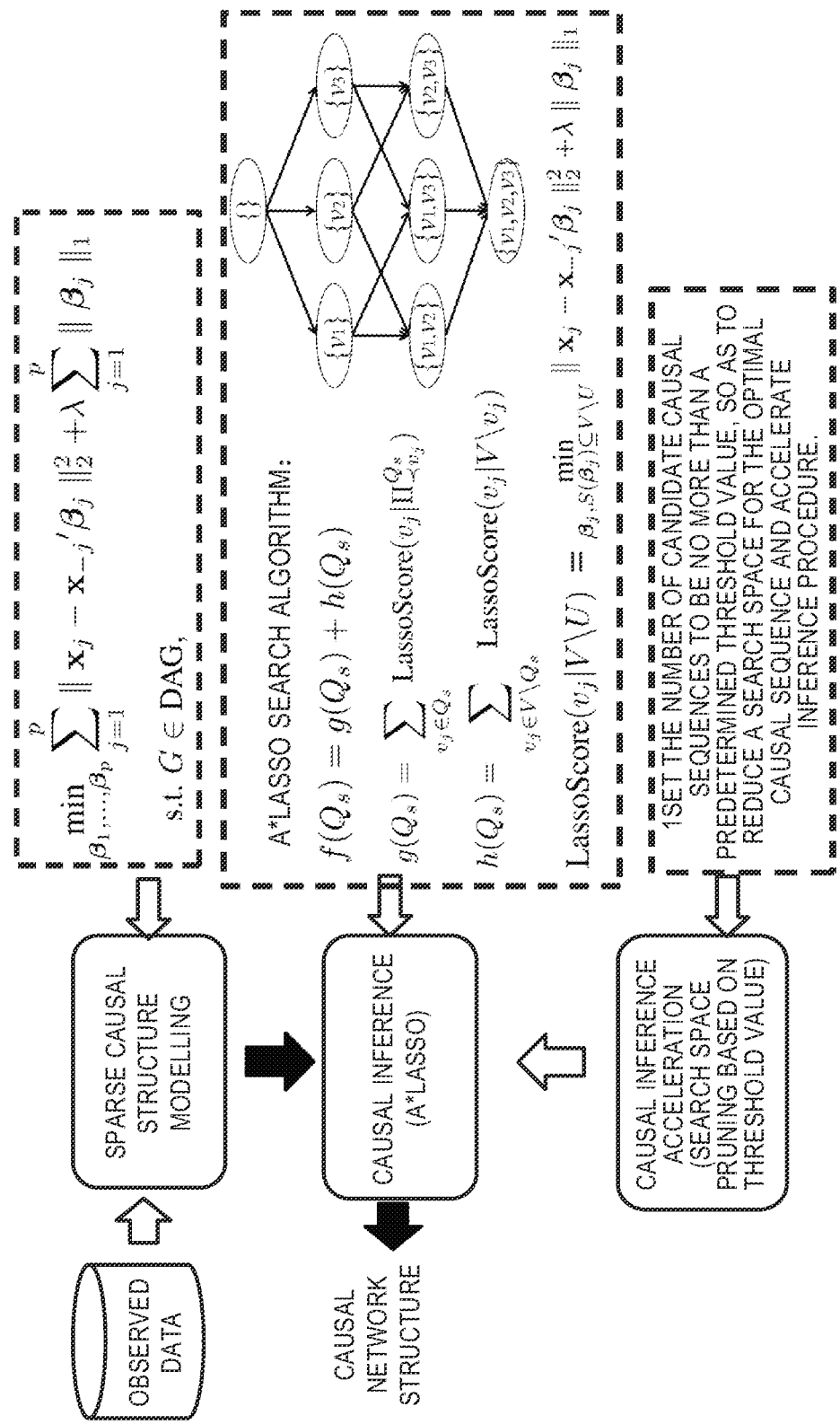
FIG. 1 schematically illustrates a solution for estimating causality in the prior art.

Hereinafter, various example embodiments of the present disclosure will be described in details with reference to the drawings. It should be noted that these drawings and description only relate to preferred embodiments which act as examples. It should be noted that alternative embodiments of structures and methods disclosed herein can be easily contemplated based on the following description and these alternative embodiments can be utilized without deviating from the principles protected by the present disclosure.

It should be understood that these example embodiments are described merely to enable those skilled in the art to better understand and further implement the present disclosure and not intended for limiting the scope of the present disclosure in any manner. Besides, in the drawings, optional steps, modules and the like will be illustrated in dashed boxes for the purpose of explanation.

As used herein, the terms "comprise(s)/comprising," "include(s)/including" and the like are to be read as open-ended terms that mean "comprise(s)/include(s), but not limited to." The term "based on" is to be read as "based at least in part on." The term "one example embodiment" is to be read as "at least one example embodiment." The term "a further embodiment" is to be read as "at least one further embodiment." Related definitions of other terms will be provided in the following description.

As described above, the current sparse causal modelling method is mainly directed at datasets in which all of the data are continuous variables or discrete variables. However, for datasets in which continuous variables and discrete variables co-exist, the existing causal model or inference algorithm either cannot support high-dimensional complicated causal structure learning of the observed variables due to the high time complexity, thus could decreases the precision of the causal structure learning because the result learned based on continuous variable discretization and conditional independence determination is not optimal.

To this end, embodiments of the present disclosure provide a new method, apparatus and system for estimating causality of observed variables in the context of mixed data types, to at least partially alleviate the above problems. According to embodiments of the present disclosure, there is proposed a method of a weighted causal network structure modelling for mixed variables, wherein a mixed causal network structure is established by integrating fitting inconsistency, sparsity constraints and weighted factors of observed data, and the weighted factors are employed to eliminate sensitivity to analysis of observed variables of different variables' types and sensitivity to estimate errors of the observed variables. Meanwhile, the causal structure learning of mixed variables is performed using a mixed causal inference algorithm based on the new mixed causal model. Particularly, in some embodiments, an optimal parent node set can be selected from an intersection of an optional parent node set of the observed variables and the current subset, instead of the entire subset, which can not only ensure that the search result is optimal but also further accelerate the inference process.

Hereinafter, the method, apparatus and system for estimating causality among observed variables according to the present disclosure will be described with reference to FIGS. 2 to 8. However, it should be understood that these descriptions are merely for the purpose of explanation and the present disclosure is not limited to the details given in these embodiments and drawings.

Figure 2:
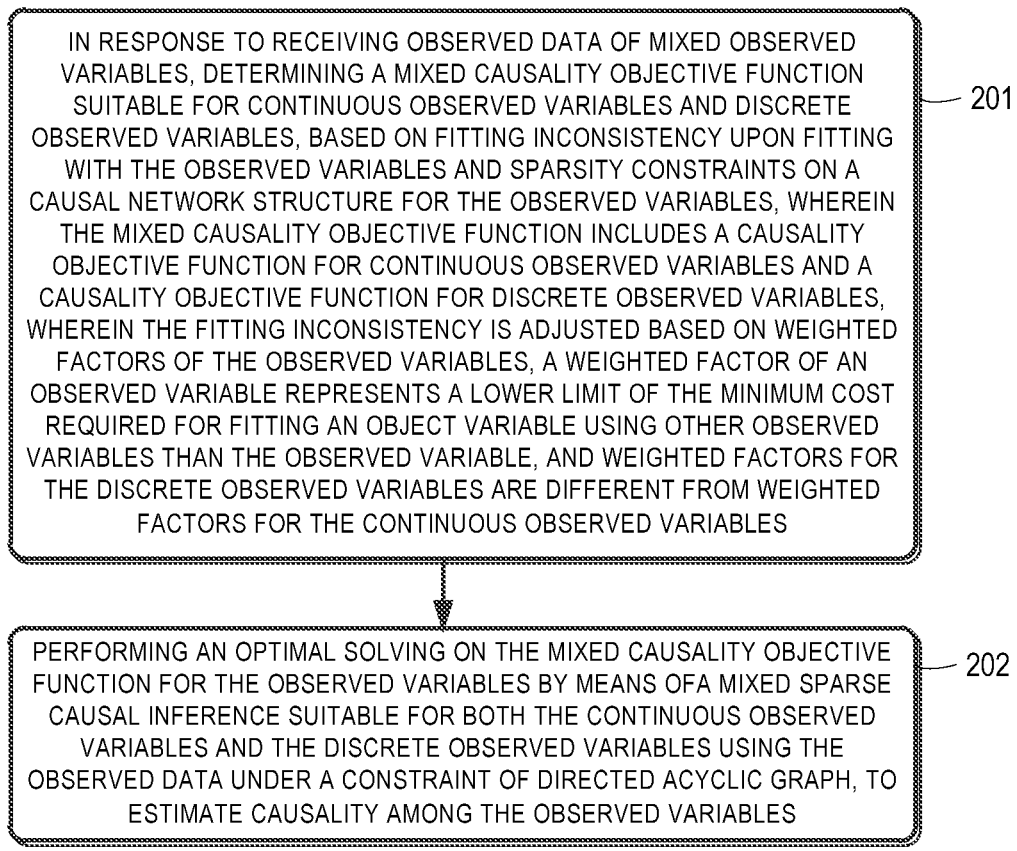
FIG. 2 schematically illustrates a flowchart of a method for estimating causality among observed variables according to an embodiment of the present disclosure.

FIG. 2 schematically illustrates a schematic diagram of a flowchart for estimating causality among observed variables according to an embodiment of the present disclosure. According to FIG. 2, first in step 201, in response to receiving observed data of mixed observed variables, a mixed causality objective function, which is suitable for continuous observed variables and discrete observed variables, is determined based on fitting inconsistency upon fitting the data and sparsity constraints on the causal network structure for the observed variables, wherein the mixed causality objective function includes a causality objective function for the continuous observed variables and a causality objective function for the discrete observed variables. The fitting inconsistency is adjusted based on weighted factors of the observed variables, a weighted factor of an observed variable represents a lower limit of the minimum cost required for fitting an object variable with other observed variables than the observed variable, and weighted factors for the discrete observed variables being different from those for the continuous observed variables.

Specifically, an observation database can be set to store system observation data X, $X \in R^{N \times D}$, wherein X is an N*D matrix, N is the number of observed samples and D is a dimension of the observed variables or the number of the observed variables. The data in the observation database can come from a third party or can be collected through other manners. Furthermore, these data can be preprocessed, such as integration, reduction and noise cancelling of the raw data etc. The preprocessing operations per se are known in the art and will not be elaborated here.

In embodiments of the present disclosure, a mixed causality objective function for the multiple observed variables can be constructed based on fitting inconsistency upon fitting the data and sparsity constraints on the causal network structure for the observed variables. However, unlike the traditional objective function, the method proposed in the present application will build a mixed variable causal model suitable for continuous observed variables and discrete observed variables, wherein the causality objective function includes a causality objective function for the observed variables of discrete type and a causality objective function for the observed variables of continuous type. In addition, the fitting inconsistency is adjusted by means of the weighted factors of the observed variables (also known as variable weighted factor for short), so as to adjust both the magnitude of the fitting inconsistency between different types of observed data and the magnitude of the fitting inconsistency between the same type of observed data to a comparable value scope, thereby reducing the sensitivity of the causal network structure to estimate errors of the observed variables.

Hereinafter, for the purpose of illustration, a Mixed Information Criterion (MIC), which is proposed in the present disclosure, for evaluating fitting degree of the mixed variable structure learning is provided first with reference to one example. The MIC is the basis of the causality objective function. For example, the MIC can be represented as:

$$MIC(G) = \sum_{i=1}^{D} MIC(X_i, Pa(X_i)) = \sum_{i=1}^{D} \frac{1}{w_i} LL(X_i \mid Pa(X_i)) + Pen(X_i, Pa(X_i))$$

Equation (1)

A first item in the equation represents fitting inconsistency adjusted by the variable weighted factor $w_j$ and a second item represents sparsity constraint on the causality structure network configured for characterizing causality among the observed variables. Specifically, G represents a causal network structure; $x_i \in R^N$ denotes a vector comprised of N observed values, describing the observed variable $X_i$; $Pa(X_i)$ denotes a parent node of $X_i$ in the causal structure G and describes causality between $X_i$ and other variables; $w_i$ denotes a scalar parameter for balancing differences in scope among variables and includes differences in continuous variables and discrete variables and differences in value scope of various continuous variables; $LL(X_i|Pa(X_i))$ depends on fitting inconsistency of the data, e.g., negative log-likelihood (also known as loss function); and $Pen(X_i, Pa(X_i))$ is used for setting sparsity constraint on causal estimate of the observed variable $X_i$, e.g., L0 sparsity constraint.

In particular, the fitting inconsistency for the observed variables of different types can be calculated in various ways. In terms of the continuous variables, it can be assumed that a linear relation exists between the continuous variables and their parent nodes and errors of the observed variables comply with Laplace distribution. Thus, the following equation can be obtained:

$$X_i = \beta_i^T X_{-i} + \varepsilon_i, \ldots \varepsilon_i \sim Laplace(0, b_i)$$

Equation (2)

where $\beta_i$ indicates causality between $X_i$ and other variables than $X_i$ and is the causal relation to be solved; $\varepsilon_i$ denotes an observed variable error for the variable $X_i$ and Laplace (0, $b_i$) shows a Laplace distribution having mean value of 0 and scale parameter of $b_i$. In the equation, if $\beta_{ij}=0$, it means that the variable $X_j$ is not the parent node of $X_i$ and $(\beta_i, X_{-i})$ accordingly indicates the parent node $Pa(X_i)$ of $X_i$.

Here, it is assumed that the variable error distribution is Laplace distribution. This is because on one hand, super-Gaussian distribution is more robust for singular points, and on the other hand, an identifiable causal structure can be obtained when the error does not follow Gaussian distribution if the method of conditional independence judgment is used for the continuous variables. On the assumption of Laplace distribution, the MIC rule for the continuous variables in the mixed variables can be denoted as:

$$LL(X_i \mid Pa(X_i)) =$$

Equation (3)

$$LL(\beta_i, X_i, X_{-i}) = \sum_{n=1}^{N} \left( \log b_i + \frac{|x_{i,n} - \beta_i^T X_{-i,n}|}{b_i} \right)$$

where n denotes the number of the observed data; $x_{in}$ indicates an n-th observed data value of the variable $X_i$; $X_{-i,n}$ denotes an n-th observed data value of other variables $X_{-i}$ than the variable $X_i$; and bi represents a scale parameter of Laplace distribution for the variable $X_i$ and $\beta_i$ is causality between $X_i$ and other variables $X_{-i}$ than the variable $X_i$.

Likewise, for the discrete variables, it can be assumed that their errors comply with logistic distribution and the following equation can be further acquired:

$$X_i = \begin{cases} 1 & \beta_i^T X_{-i} + \varepsilon_i > 0 \\ 0 & \text{otherwise} \end{cases}, \varepsilon_i \sim \text{Logistic}(0, 1)$$

Equation (4)

where $\beta_i$ indicates causality between $X_i$ and other variables $X_{-i}$ than the variable $X_i$ and is the causal relation to be solved; $\varepsilon_i$ denotes a variable error for the variable $X_i$ and Logistic (0, 1) represents a logistic distribution having a mean value of 0 and a scale parameter of 1. In this case, the MIC rule for the continuous variables in the mixed variables can be denoted as:

$$LL(X_i \mid Pa(X_i)) =$$

Equation (5)

$$LL\left(\beta_i, X_i, X_{-i} \sum_{n=1}^{N} (1 - x_{i,n}) \log\left(1 + e^{\beta_i^T X_{-i,n}}\right) - x_{i,n} \beta_i^T X_{-i,n} \right)$$

where n denotes the number of the observed data; $x_{in}$ indicates an n-th observed data value of the variable $X_i$; $X_{-i,n}$ denotes the n-th observed data value of other variables than the variable $X_i$; and $\beta_i$ is causal relation between $X_i$ and other variables $X_{-i}$ than the variable $X_i$.

In other words, in the mixed information criterion MIC of equation (1), the MIC of equation (3) is employed for observed data of continuous type and the criterion of the equation (5) is utilized for the observed data of discrete type. The integrated results of the two criteria will serve as the MIC for the fitting degree of the mixed variable structure learning.

Moreover, for $w_i$, the weighted factor for balancing differences in value scope among variables in equation (1), an example calculation method is provided below.

$$Pa_c(X_i) = \arg\min_{X' \subseteq X_{-i}} LL(X_i \mid X'),$$

$$w_i = LL(X_i \mid Pa_c(X_i))$$

Equation (6)

where $Pa_c(X_i)$ represents an optimal set of potential parent nodes for $X_i$ and a parent node set of $X_i$ is one subset of the optimal set of potential parent nodes, i.e., $Pa(X_i) \subseteq Pa_c(X_i)$. Therefore, $LL(X_i \mid Pa(X_i))/w_i$ in equation (1) denotes a relative loss adjusted by the weighted factor. Compared with the absolute loss, the relative loss reduces data differences caused by different variable scopes and decreases the sensitivity of the model to the estimate error of the observed variable $X_i$ as well.

In the embodiments of the present disclosure, the specific equation used for calculating $w_i$ in the above equation (6) varies for different types of observed variables. For example, for the observed variables of continuous type, $w_i$ can be calculated based on the Laplace assumption by the following equation:

$$LL(\beta_i, X_i, X') = \sum_{n=1}^{N} \left( \log b_i + \frac{|x_{i,n} - \beta_i^T X'_n|}{b_i} \right)$$

Equation (7)

The equation (7) is similar to equation (3), but differs in the use of X', which indicates the parent node of $X_i$ and is a subset of $X_{-i}$. Similarly, for the observed variables of discrete type, $w_i$ can be calculated based on the assumption of logistic distribution, for example, by the following equation:

$$LL(\beta_i, X_i, X') = \sum_{n=1}^{N} \left( (1 - x_{i,n}) \log\left(1 + e^{\beta_i^T X'_n}\right) - x_{i,n} \beta_i^T X'_n \right)$$

Equation (8)

Equation (7) is similar to equation (5) and differs in the use of X', which indicates the parent node of $X_i$ and is a subset of $X_{-i}$.

It also can be seen from equations (7) and (8) that the calculation of the variable weighted factor adopts a structure similar to the original objective function (objective function not adjusted by the variable weighted factor), to calculate a lower limit of the minimum cost required for fitting the object variable with other variables without considering the variable $x_i$. However, when the variable weighted factor is being calculated, the lower limit of the minimum cost is obtained without using a directed acyclic graph. However, it should also be noted that the variable weighted factor also can be determined in other similar ways as long as the similar effect is achieved.

In this way, for each observed variable $X_i$, its optimal set of potential parent nodes can be firstly determined via the above equations and the weighted factor $w_i$ can be correspondingly determined based on the determined optimal set of potential parent nodes. That is to say, in fact the negative log-likelihood in the context of the optimal set of potential parent nodes is solved. Hence, the equation (6) also can be directly denoted as:

$$w_i = \min_{\beta_i, S(\beta_i) \subseteq X_{-i}} LL(\beta_i, X_i, X_{-i})$$

Equation (9)

Furthermore, the following example of mixed causality objective functions can be provided on the basis of Mixed Information Criterion (MIC) for evaluating fitting degree of the mixed variable structure learning in the present disclosure, wherein a robust model of a sparse causal structure is built using log-likelihood of the observed data of discrete type and the observed data of continuous type, variable weighted factor, and L0 sparsity constraint.

$$\min_{\beta_1, \ldots, \beta_D} \sum_{i=1}^{D} MIC(\beta_i, X_i, X_{-i})$$

Equation (10)

-continued $$\text{S.t. } G_{\{\beta_1,\ldots,\beta_D\}} \in DAG,$$

$$MIC(\beta_i, X_i, X_{-i}) = \frac{LL(\beta_i, X_i, X_{-i})}{w_i} + \lambda \|\beta_i\|_0,$$

$$LL(\beta_i, X_i, X_{-i}) = (1 - z_i) \sum_{n=1}^{N} \left( \log b_i + \frac{|x_{i,n} - \beta_i^T X_{-i,n}|}{b_i} \right) +$$

$$z_i \sum_{n=1}^{N} \left( (1 - x_{i,n}) \log(1 + e^{\beta_i^T X_{-i,n}}) - x_{i,n} \beta_i^T X_{-i,n} \right)$$

$$Pa_c(X_i) = \arg\min_{X' \subseteq X_{-i}} LL(X_i \mid X'),$$

$$w_i = LL(X_i \mid Pa_c(X_i))$$

Where $x_i \in R^N$ denotes a vector comprised of N observed values, describing the observed variable $X_i$;

$x_{-i} \in R^{(D-1)}$ represents all data in the observed data except variable $X_i$, and each column in the matrix respectively corresponds to variable $X_1, \ldots, X_{i-1}, X_{i+1}, \ldots, X_D$;

$\beta_i \in R^{D-1}$ denotes a parameter to be estimated describing causal strength between the variable $X_i$ and other variables;

$\|A\|_0$ denotes L0 norm of the vector;

Constraint $G \in DAG$ is used for constraining the causal network structure as a directed acyclic graph;

$\lambda_i$ is denotes a super parameter for setting the strength of sparsity constraint on causal estimate of the observed variable $X_j$;

$w_i$, as a scalar parameter, denotes a variable weighted factor for reducing sensitivity of the model to the estimate error of the observed variable $X_j$; and $z_i$ indicates the type of data, $z_i=1$ representing discrete variable and $z_i=0$ denoting continuous variable.

It can be seen from the above objective function (10) that the mixed causality objective function includes a causality objective function for the continuous observed variables and a causality objective function for the discrete observed variables. For the discrete observed variables, the causality objective function for the discrete observed variables can be employed, and for the continuous observed variables, the causality objective function for the continuous observed variables can be used. Furthermore, the fitting inconsistency is also adjusted using the weighted factor $w_i$ of the variable distribution for continuous observed variables and discrete observed variables. Specifically, the original fitting inconsistency is divided by the variable weighted factor. However, it should be noted that the adjustment also can be performed in other similar ways as long as the similar effects can be achieved.

The fitting inconsistency of different data types and the fitting inconsistency of same data type can be converted, using the variable weighted factor $w_i$, into comparable magnitudes, so as to eliminate the sensitivity of the objective function to the variable estimate error and make the objective function more robust.

Additionally, it also can be observed from the objective function (10) that the L0 sparsity constraint is employed. However, it should be noted that the present invention is not limited thereto. In fact, the objective function (1) also can adopt L1 sparsity constraint. It should be clarified that the L1 sparsity constraint, when reducing dimensions, not only deletes the factors irrelevant to the objective, but also possibly deletes the factors related to the objective, thereby affecting the accuracy of the sparse dimension reduction. However, such deficiency can be overcome by L0 sparsity constraint.

Next, in step 202, an optimal solving is performed on the mixed causality objective function for the multiple observed variables by means of a mixed sparse causal interference, which is suitable for both continuous observed variables and discrete observed variables, using the mixed observed data under the constraint of directed acyclic graph, so as to estimate the causality among the multiple observed variables.

The above causality objective function constrained by a directed acyclic graph can be converted, using a traditional method, into a problem of solving an optimal causal sequence with recursion. According to an embodiment of the present disclosure, the converted recursion problem can be described as below:

$$OptScore(U) = \qquad\qquad\qquad \text{Equation (11)}$$
$$\min_{v_j \in U} OptScore(U \setminus v_j) + BestScore(v_j \mid V \setminus U)$$

$$\pi_1^U = \underset{v_j \in U}{\operatorname{argmin}}\, OptScore(U \setminus v_j) + BestScore(v_j \mid V \setminus U),$$

$$BestScore(v_j \mid V \setminus U) = MScore(v_j \mid V \setminus U) \qquad \text{Equation (12)}$$
$$= \min_{\beta_j, S(\beta_j) \subseteq V \setminus U} MIC(\beta_j, X_j, X_{-j})$$

where V denotes a set of all observed variable, U denotes a set of unsorted observed variables; $\pi_1^U$ denotes a variable which belongs to the variable set U and ranks first in the causal sequence and $S(\beta_j)$ represents a support set of the vector $\beta_j$.

There are a variety of methods to solve the equation (11), such as traditional A*search algorithm or any other suitable algorithms. However, for continuous data and discrete data distributions, the feature selection criteria respectively suitable therefor are adopted.

In addition, when the causal sequence recursion problem is being solved, an extended A* search algorithm, which is an extension of the traditional A* search algorithm, also can be employed. In an embodiment disclosed herein, there is proposed a solution based on the extended A* search algorithm. The extended A* search algorithm can be referred to as mixed A*FoBa algorithm here used for searching an optimal causal sequence generation path in the space of the causal sequence graph. However, in case of $z_i=1$, i.e., the case of the discrete variables, a FoBa sparse regression algorithm related to the discrete variables is adopted, e.g., feature selection is based on F1-score; however, in case of $z_i=0$, i.e., the case of continuous variables, a FoBa sparse regression algorithm related to the continuous variables is adopted. At this time, the feature selection can be based on, for example, a Mean Absolute Error (MAE).

Hereinafter, function $f$ can be represented according to the mixed A*FoBa algorithm as below:

$$f(Q_s) = g(Q_s) + h(Q_s) \qquad \text{Equation (14)}$$

where $g(Q_s)$ represents the cost spent from a starting node through the node $Q_s$ to the current node while $h(Q_s)$ denotes a predicted cost from the current node to the target node, wherein $g(Q_s)$ and $h(Q_s)$ can be calculated respectively according to the following equation:

$$g(Q_s) = \sum_{x_j \in Q_s} MScore\left(x_j \mid \prod_{<V}^{Q_s}\right)$$

Equation (14)

$$h(Q_s) = \sum_{x_j \in V/Q_s} MScore(x_j \mid V/\{x_j\})$$

$$MScore(x_j \mid S) = \min_{\beta_i, supp(\beta_i) \subset S} \frac{LL(\beta_i, X_i, X_{-i})}{w_i} \lambda \|\beta_i\|_0,$$

$$LL(\beta_i, X_i, X_{-1}) = (1 - z_i) \sum_{n=1}^{N} \left(\log b_i + \frac{|x_{i,n} - \beta_i^T X_{-i,n}|}{b_i}\right) +$$

$$z_i \sum_{n=1}^{N} \left((1 - x_{i,n})\log(1 + e^{\beta_i^T X_{-i,n}}) - x_{i,n}\beta_i^T X_{-i,n}\right)$$

It should be noted: in order to guarantee an optimal solution can be found by the extended A*search algorithm, h( ) function should satisfy two characteristics: being consistent and being admissible, wherein being consistent means that for any two nodes $Q_s$ and $Q_s'$ ($Q_s'=[Q_s, x_j]$), if $h(Q_s) \leq h(Q_s') + MScore(x_j|Q_s)$, h( ) function can be considered as satisfying consistency. Being admissible indicates that an estimate $h(Q_s)$ of the cost required from the current node $Q_s$ to the target node should be an underestimate of the real cost.

It can be observed from the equation (6) that in the mixed A*FoBa search algorithm, h function and g function are different from the traditional A*search algorithm. A cost (g function) spent from a starting node to the current node and a predicted cost (h function) from the current node to the target node are determined based on the fitting inconsistency adjusted by the variable weighted factor and the sparsity constraint on the causal network structure for the observed variables.

Hereinbelow, an example flow of a mixed A*FoBa search method according to an embodiment of the present disclosure will be described with reference to FIG. 3.

Figure 3:
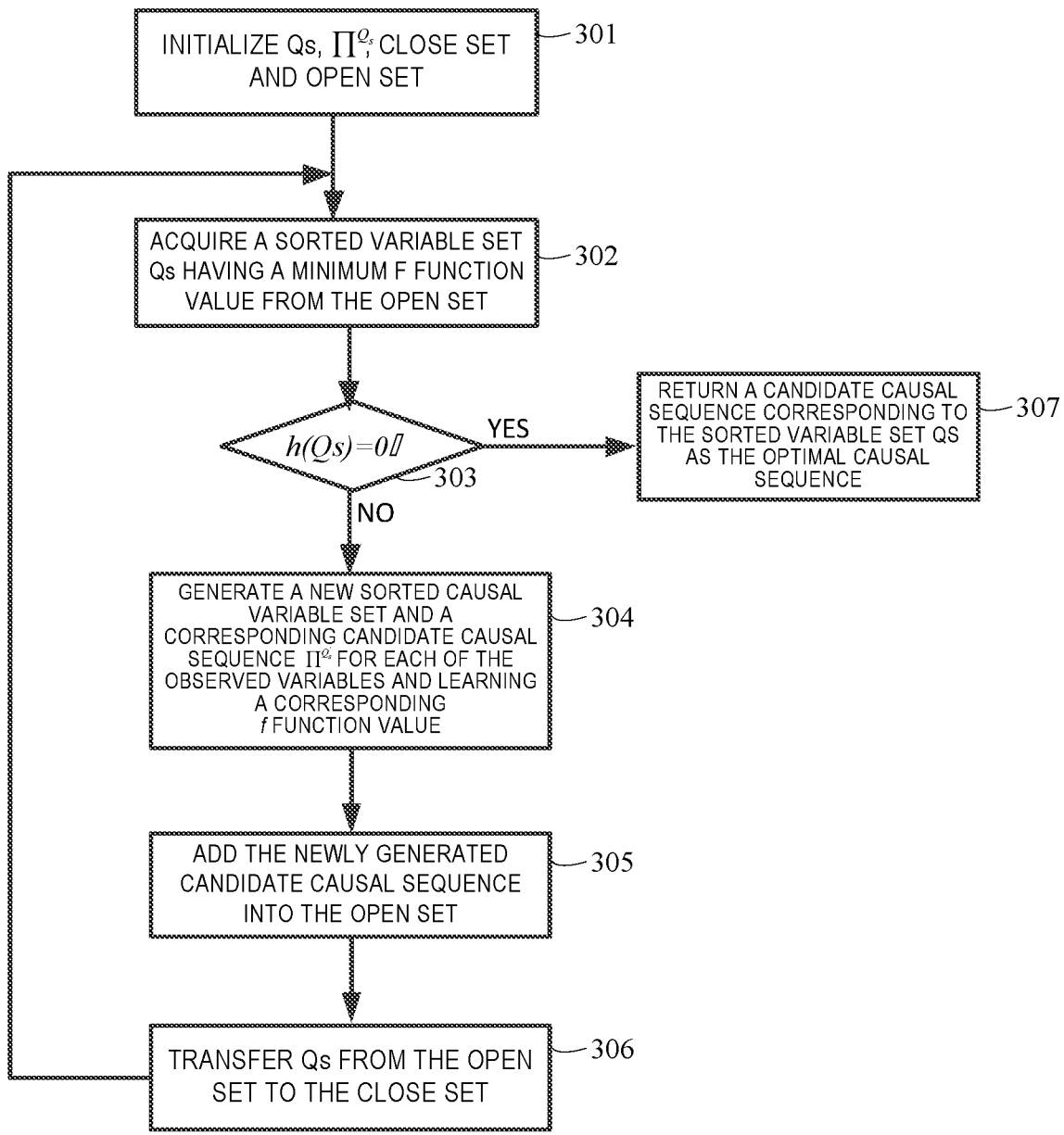
FIG. 3 schematically illustrates a flowchart of a method of sparse causality inference according to an embodiment of the present disclosure.

According to FIG. 3, an initialization operation is executed first in step 301. Particularly, causal sequence set CLOSE, sorted variable set $Q_s$, candidate causal sequence $\Pi^{Q_s}=[\ ]$ and causal sequence set OPEN are initialized.

The causal sequence set CLOSE is provided for storing a sorted sequence set of a new candidate causal sequence generated based thereon and can be initialized to an empty set during initialization. The sorted variable set $Q_s$ denotes a set of sorted variables and can be initialized to an empty set during initialization. The candidate causal sequence $\Pi^{Q_s}=[\ ]$ is a candidate sequence of the sorted variables. The causal sequence set OPEN can take the following form:

$$OPEN=\{(Q_s, f(Q_s), \Pi^{Q_s}=[\ ]\}$$

Equation (15)

where $Q_s$ denotes a sorted variable set, $f(Q_s)$ denotes the above equation (13) and $\Pi^{Q_s}=[\ ]$ denotes a candidate causal sequence, which can be initialized as:

$$OPEN = \left\{\left(Q_s, f(Q_s) = g(Q_s) + h(Q_s) = \right.\right.$$

Equation (16)

$$\left.\left. 0 + h(Q_s) = \sum_{i=1}^{D} MScore(x_i \mid V/\{x_i\}), \prod^{Q_s} = [\ ]\right)\right\}$$

Next, a sorted variable set $Q_s$ with a minimum f function value is extracted from the OPEN set in step 302 and it is determined, in step 303, whether the h function of $Q_s$ is 0, i.e., whether a path to the target node has been found. If it is zero, the candidate causal sequence corresponding to the minimum value of the f function is returned as the optimal causal sequence; otherwise, the method goes to step 304. At an initial operation, the OPEN set does not contain any sorted variable sets and the method will also proceed to step 304 to generate a new sorted variable set.

In step 304, a new sorted causal sequence set Qs' and a candidate causal sequence $\Pi^{Q_s'}=[Q,v]$ are generated for each observed variable: $v \in V \setminus Qs$ and the corresponding f(Qs') is learned.

$$f(Q_s')=g(Q_s')+h(Q_s')=g(Q_s)+h(Q_s)+MScore(v|Q_s)-MScore(v|V\setminus\{v\})$$

Equation (17)

For the initial operation, the Qs is empty, a new sorted causal set and a corresponding candidate causal sequence can be generated for each observed variable v, and the corresponding f(Qs') is learned.

Afterwards, in step 305, the generated candidate causal sequence is added into the OPEN set to update the OPEN set, i.e.:

$$OPEN=\{(Q_s', f(Q_s'), \Pi^{Q_s'}=[Q_s,v]\}$$

Next in step 306, the previously extracted $Q_s$ with a minimum f function value is transferred to the CLOSE set from the OPEN set, i.e., deleting $Q_s$, and its related information from the OPEN set and adding them into the CLOSE set. Then, the method jumps to 302 to continue the execution.

The operations of steps 301 to 305 can be executed repetitively until a sorted variable set with h function value of 0 is found and the corresponding candidate causal sequence is returned as the optimal causal sequence.

For illustrative purposes, three observed variables are taken as examples for simple explanation. However, it should be noted that the dimension of the observed variables will be much higher in the actual practice. For three observed variable sets $\{v_1\}$, $\{v_2\}$ and $\{v_3\}$, the OPEN set is empty at the initial operation, new sorted observed variable sets $\{v_1\}$, $\{v_2\}$ and $\{v_3\}$ are generated respectively for each of the observed variables $v_1$, $v_2$ and $v_3$, corresponding candidate causal sequences are obtained and corresponding $f(Q_s')$s are learned. The generated candidate causal sequences will be placed in the OPEN set. At the second operation, a sorted variable set with a minimum f function value, for example $\{v_2\}$, is found from the three variable sets, and the h function value of $\{v_2\}$ is then determined. At this moment, the h function value is non-zero. Therefore, two sorted sets, such as $\{v_1, v_2\}$ and $\{v_2, v_3\}$, corresponding candidate causal sequences $v_2, v_1$ and $v_1, v_3$ and corresponding $f(Q_s')$s are generated subsequently. Afterwards, $\{v_2\}$ and its related information are deleted from the OPEN set and placed into the CLOSE set. At the third operation, a sequence with a minimum f function value, for example $\{v_2, v_3\}$, is selected from the OPEN set; a sorted sequence $\{v_1, v_2, v_3\}$, corresponding candidate causal sequence $v_2, v_3, v_1$ and corresponding $f(Q_s')$ are further generated; and $\{v_2, v_3\}$ and its related information are transferred from the OPEN set to the CLOSE set. At the fourth operation, a sequence with a minimum f function value, such as $\{v_1, v_2, v_3\}$ this time, is selected, and its h function value is zero. Hence, the corresponding candidate causal sequence $v_2, v_3, v_1$ can be returned as the optimal causal sequence, so as to complete the searching process.

Figure 4:
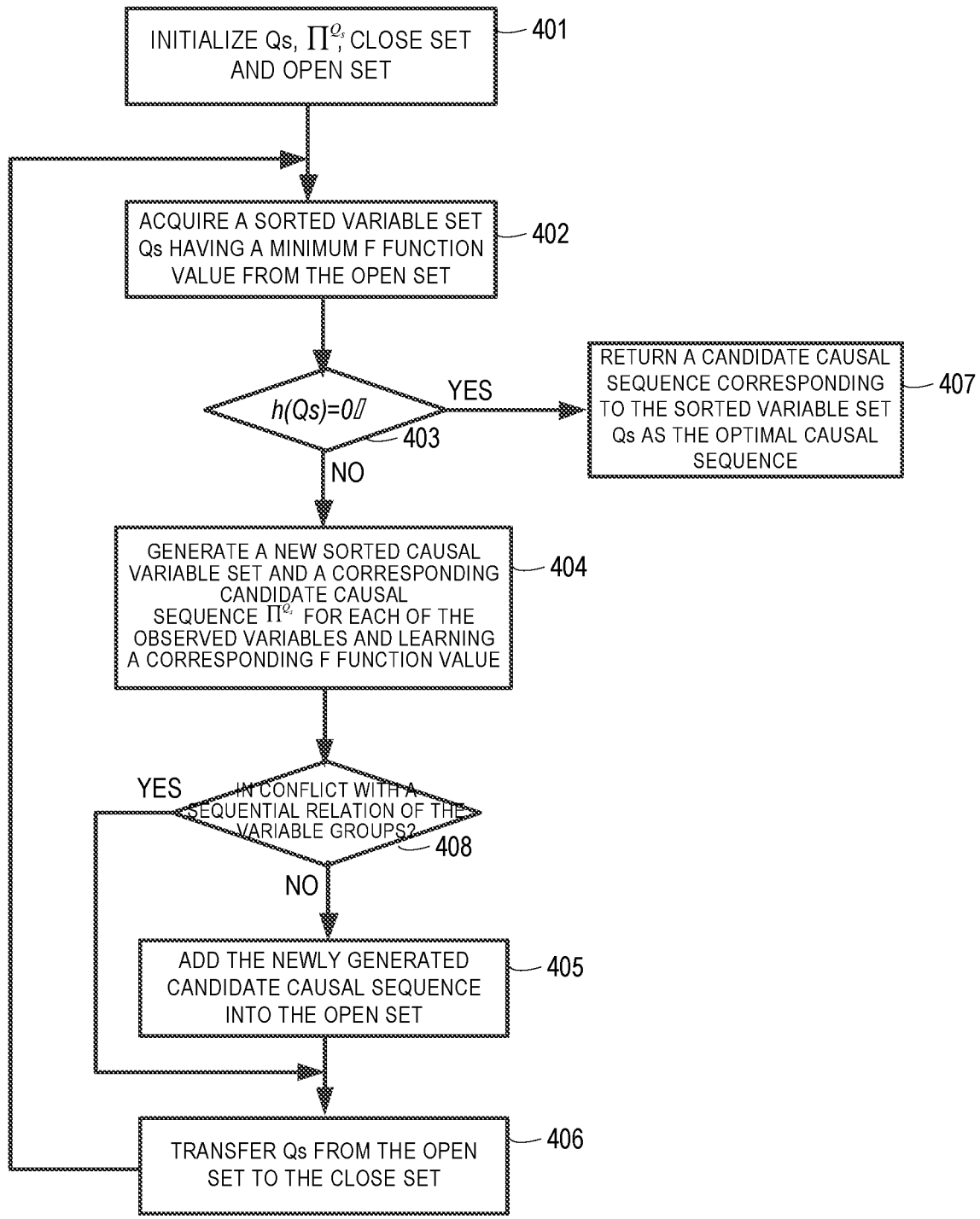
FIG. 4 schematically illustrates a flowchart of a method of sparse causality inference according to another embodiment of the present disclosure.

In addition, during the searching process of iterative operations, search space pruning also can be adopted to accelerate the sparse causality inference. In an embodiment of the present disclosure, a search space pruning based on sequential relations of variable groups is used, instead of the threshold value-based search space pruning in the prior art. In other words, it is proposed to introduce sequential relations of variable groups $G_1 \prec\prec G_2 \prec\prec \ldots \prec\prec G_z$ in the present disclosure and the search space of the sequence graph is pruned according to the sequential relations of variable groups. FIG. 4 illustrates an example flowchart of a mixed A*FoBa search method when the search space pruning is adopted.

According to FIG. 4, steps 401 to 407 in FIG. 4 are identical to steps 301 to 307 in FIG. 3 and will not be elaborated herein. The difference between FIG. 4 and FIG. 3 lies in step 408, newly added between steps 404 and 405, for search space pruning based on the sequential relations of variable groups. When a new sorted causality sequence set Qs' and a corresponding candidate causal sequence $\Pi^{Q_{s'}}$= $[Q_s, v]$ are obtained in step 404, the candidate causal sequence $\Pi^{Q_{s'}}$ is further verified using sequential relations of variable groups in step 408, to determine whether the candidate causal sequence is in conflict with the sequential relations of variable groups. If there is no conflict between the candidate causal sequence and the sequential relations of variable groups, the method proceeds to step 405, where the newly generated candidate causal sequence is added into the OPEN set. On the contrary, if there is a conflict between the candidate causal sequence and the sequential relations of variable groups, the method skips the step 405 and directly performs the step 406. In this way, the search space can be pruned to accelerate the process of finding an optimal solution.

The sequential relations of variable groups can be obtained in various ways. For example, experts in the related field can offer the sequential relations of variable groups. For example, for G1={$v_1, v_2$}, G2={$v_3, v_6$} and G3={$v_3, v_5, v_7, v_8$}, the experts in the field can present the sequential relations of variable groups $G_1 \prec\prec G_2 \prec\prec \ldots \prec\prec G_z$. Moreover, the relation of the variable groups also can be obtained by automatic learning of the observed data. An example method for automatically learning the sequential relations of the variable groups will be described below with reference to FIG. 5.

Figure 5:
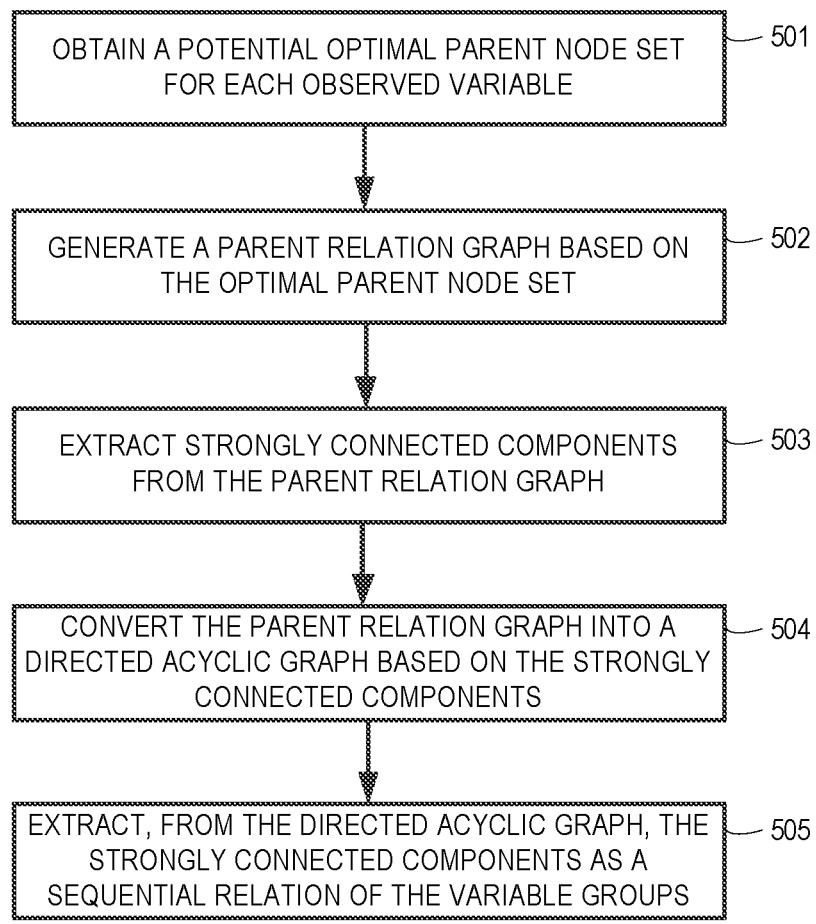
FIG. 5 schematically illustrates a flowchart of a method for generating a sequential relation of variable groups according to an embodiment of the present disclosure.

According to FIG. 5, a potentially optimal parent node set $POP_i$ is obtained for each observed variable $v_i (i \in \{1, \ldots, D\})$ in the first place in step 501. The potentially optimal parent node set of each observed variable can be acquired in different ways, such as using the traditional A* search sparse regression algorithm, A*lasso search algorithm and the like. Additionally, the set also can be obtained using the mixed A*FoBa sparse regression algorithm proposed in the present disclosure. The detailed manner for acquiring the optimal parent node set is known in the art and will not be repeated here.

Next, in step 502, a parent relation graph is generated based on the optimal parent node set $\{POPS_1, \ldots, POPS_p\}$ obtained in step 501. Specifically, each observed variable can be converted into a node in the graph and an edge pointing from $V_p$ to $V_i$ can be generated for each observed variable $V_p \in POPS_i$ to describe that the variable $V_p$ is a potential parent node of the variable $V_i$. FIG. 6A illustrates an example of the parent relation graph according to embodiments of the present disclosure, wherein 6 variables are involved.

Then in step 503, a strongly connected component SCC is extracted from the parent relation graph generated in step 502 to obtain $\{SCC_1, \ldots, SCC_M\}$, wherein $SCC_1 \cup \ldots \cup SCC_M = \{v_1, \ldots, v_D\}$, i.e., a union of all strongly connected components is a universal set of the variables. The strongly connected component is a set of nodes which can form a loop by themselves and cannot from a loop with other nodes or strongly connected components. FIG. 6B schematically illustrates strongly connected components $SCC_1$ and $SCC_2$ extracted from the parent relation graph shown in FIG. 6A.

Next in step 504, the parent relation graph of step 502 is converted, based on the generated strongly connected components SSCs, into a new directed acyclic graph $G_{new}$. One example method is converting each strongly connected component $SCC_1$ into a new node $N_i$; if there is an edge pointing from any node in the $SCC_1$ to a node in the $SCC_j$ in the parent relation graph, an edge pointing from $N_i$ to $N_j$ is added into $G_{new}$. FIG. 6C illustrates a new directed acyclic graph generated according to the strongly connected components in FIG. 6B. The strongly connected components $SCC_1$ and $SCC_2$ in FIG. 6B are respectively converted into two new nodes $N_1$ and $N_2$. Since there is an edge pointing to $SSC_2$ in the $SCC_1$ of the parent relation graph of FIG. 6A, an edge pointing from $N_1$ to $N_2$ is added between the two nodes $N_1$ and $N_2$. In this way, a new directed acyclic graph $G_{new}$ can be acquired.

Finally, in step 505, strongly connected components of all directed acyclic graphs are extracted and their sequential relations act as the sequential relations of the variable groups. The sequential relations of the variable groups $G_1 \prec\prec \ldots \prec\prec G_M$, $G_1 = SSC_p, \ldots, G_M = SSC_q$ can be directly obtained in the directed acyclic graphs and thus the sequential relations $SSC_p \prec\prec \ldots \prec\prec SSC_q (|\{p, \ldots, q\}| = M)$ can be obtained. For example, $SCC_1 \prec\prec SCC_2$ can be acquired for the new directed acyclic graph shown in FIG. 6C.

In this way, the sequential relation of the variables groups for search space pruning can be obtained. However, it should be noted that the present invention is not limited to this and any other manners for obtaining the sequential relation of the variable groups are also feasible.

In the embodiments of the present disclosure, a mixed causality objective function, including both a causality objective function for discrete observed variables and a causality objective function for continuous observed variables, is built for observed data of mixed observed variables. Besides, fitting inconsistency is adjusted via weighted factors of the observed variables and the mixed sparse causal inference is employed in the inference process. Accordingly, the solution of estimating causality among observed variables proposed by the embodiments of the present disclosure is suitable for causality estimation in the context of mixed observed data and the causal network structure is less sensitive to the estimate errors of the observed variables, so a more precise causality can be acquired. Furthermore, as further described in the following embodiments, pruning of the search space also can be achieved using a search space pruning technology based on sequential relations of the variable groups, to accelerate and optimize a solution to the problem.

Figure 7:
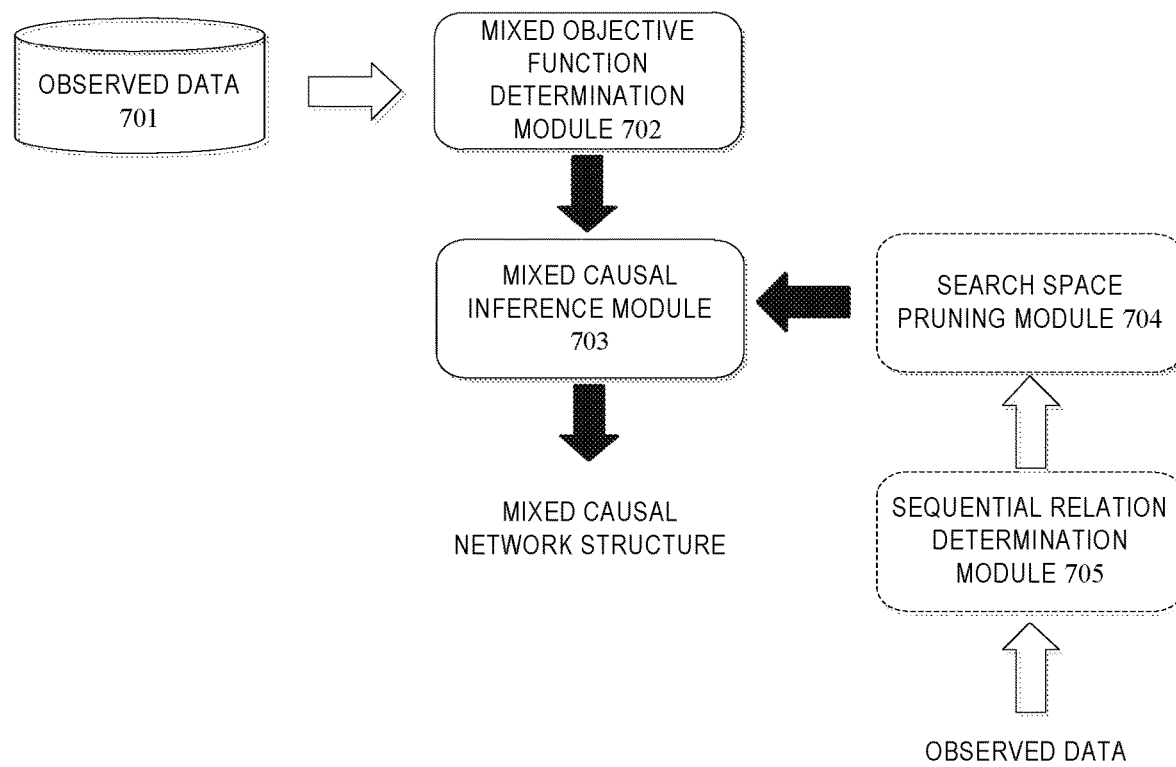
FIG. 7 schematically illustrates a flowchart of an apparatus for estimating causality among observed variables according to an embodiment of the present disclosure.

FIG. 7 also illustrates a block diagram of an example apparatus 700 for estimating causality among observed variables according to an embodiment of the present disclosure. According to FIG. 7, the apparatus 700 includes a mixed objective function determination module 702 and a mixed causal inference module 703.

The objective function determination module 702 can be configured: in response to receiving observed data of mixed observed variables, determine a mixed causality objective function suitable for continuous observed variables and discrete observed variables, based on fitting inconsistency upon fitting the data and sparsity constraints on a causal network structure for the observed variables. The mixed causality objective function includes a causality objective function for continuous observed variables and a causality objective function for discrete observed variables, wherein the fitting inconsistency is adjusted based on weighted factors of the observed variables, a weighted factor of an observed variable represents a lower limit of a minimum cost required for fitting an object variable using other observed variables than the observed variable. Besides, weighted factors for the discrete observed variables are different from weighted factors for the continuous observed variables. An observation database 701 can be configured, in which system observation data X ($X \in R^{N \times D}$) is stored, wherein X is an N*D matrix, N denotes the number of observed samples and D denotes a dimension of the observed variables or the number of the observed variables. The data in the observation database can come from a third party or can be collected through other manners. Furthermore, the data can be preprocessed.

The causal inference module 703 is configured to optimally solve a mixed causality objective function for the multiple observed variables by means of a mixed sparse causal inference, which is suitable for continuous observed variables and discrete observed variables, using the observed data under a constraint of directed acyclic graph, to estimate causality among the multiple observed variables.

In embodiments according to the present disclosure, a causality objective function for continuous observed variables can be built on an assumption that errors of observed variables are Laplace distributions and a causality objective function for discrete observed variables is built on an assumption that errors of observed variables are logistic distributions.

In embodiments according to the present disclosure, weighted factors for continuous observed variables are calculated on an assumption that errors of observed variables are Laplace distributions and the weighted factors for discrete observed variables are calculated on an assumption that errors of observed variables are logistic distributions.

In embodiments according to the present disclosure, the mixed causal inference module is configured to convert a mixed sparse causal inference of a variable model for the multiple observed variables into a problem of solving an optimal causal sequence with recursion. The causal inference module 703 can be configured to determine, based on adjusted fitting inconsistency and sparsity constraints on a causal network structure for the observed variables, a cost (g function value) from a starting node to a current node and a predicted cost (h function value) from a current node to a target node. Regarding a problem of solving an optimal causal sequence with recursion, one can refer to the above description with reference to FIG. 3.

In embodiments according to the present disclosure, the sparsity constraint can be L0 sparsity constraint.

In an embodiment according to the present disclosure, the apparatus 700 also can further comprise a search space pruning module 704 configured to, in a process of solving an optimal causal sequence recursion: determine, for a newly generated candidate, causal sequence, whether it is in conflict with a predetermined sequential relation of variable groups; and if it is-determined that it is in conflict therewith, abandon the newly generated candidate causal sequence. For the search space pruning, one can refer to the above description with reference to FIG. 4.

In an embodiment according to the present disclosure, the predetermined sequential relation of variable groups is given by experts in the field. In a further implementation of the present disclosure, the predetermined sequential relation of variable groups is automatically determined based on the observed data.

In a further implementation according to the present disclosure, the apparatus 700 also can further comprise a sequential relation determination module 705. The sequential relation determination module 705 can be configured to automatically determine the predetermined sequential relation of variable groups by: obtaining a potentially optimal parent node set for each of the observed variables; generating a parent relation graph based on the obtained optimal parent node set; extracting strongly connected components from the parent relation graph; converting the parent relation graph into a new directed acyclic graph by converting each component in the strongly connected components into a new node and adding a corresponding edge between respective new nodes in the presence of connectivity between two strongly connected components in the parent relation graph; and extracting a sequential relation between strongly connected components in the directed acyclic graph to consider it as the predetermined sequential relation of variable groups. For the automatic determination of the sequential relation of the variable groups, one can refer to the above description with reference to FIG. 5.

Figure 8:
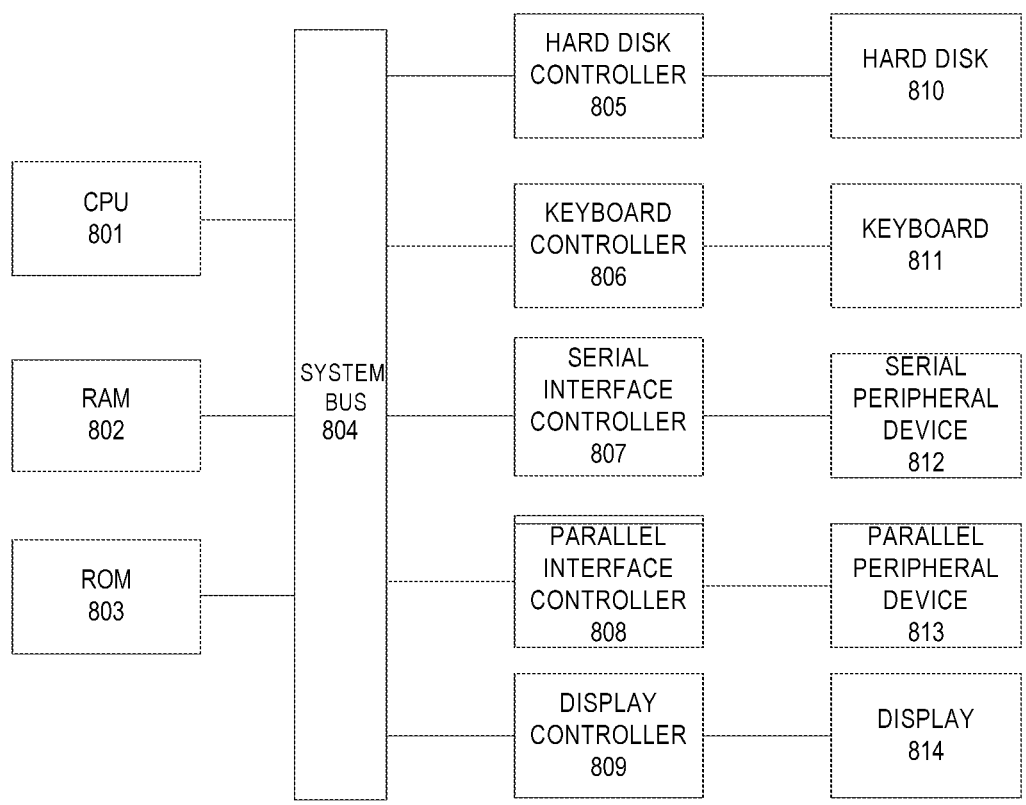
FIG. 8 schematically illustrates a schematic diagram of a system for estimating causality among observed variables according to an embodiment of the present disclosure.

FIG. 8 schematically illustrates a schematic diagram of a system for estimating causality among observed variables according to an embodiment of the present disclosure. Next, reference will be made to FIG. 8 to describe a system for implementing causality estimation of the present invention A computer system illustrated in FIG. 8 comprises CPU (Central Processing Unit) 801, RAM (Random Access Memory) 802, ROM (Read-Only Memory) 803, system bus 804, hard disk controller 805, keyboard controller 806, serial interface controller 807, parallel interface controller 808, display controller 809, hard disk 810, keyboard 811, serial peripheral device 812, parallel peripheral device 813 and display 814. Among these components, the system bus 804 is connected with CPU 801, RAM 802, ROM 803, hard disk controller 805, keyboard controller 806, serial interface controller 807, parallel interface controller 808 and display controller 809. The hard disk 810 is connected with the hard disk controller 805; the keyboard 811 is connected with the keyboard controller 806; the serial peripheral device 812 is connected with the serial interface controller 807; the parallel peripheral device 813 is connected with the parallel interface controller 808; and the display 814 is connected with the display controller 809.

The memory can be stored with one or more codes which, when being executed by the computer, triggers the CPU to perform actions of the method proposed in the embodiments of the present disclosure, such as those embodiments described with reference to FIGS. 2 to 6 hereinabove.

It should be appreciated that the structural block diagram of FIG. 8 is presented for illustrative purposes and does not limit the present invention in any way. In some cases, some devices therein can be added or reduced as required.

It can be understood that the solution provided in the present disclosure can be applied in various applications, such as pharmaceuticals, manufacturing, market analysis, traffic forecast, weather forecast, air quality forecast and the like, to acquire advantageous effects.

Moreover, embodiments of the present invention can be fulfilled by software, hardware of combinations of software and hardware. The hardware portion can be implemented by dedicated logic; the software portion can be stored in a memory and executed by a suitable instruction execution system, such as microprocessor or dedicated design hardware.

The ordinary skilled in the art can understand that the above method and apparatus can be realized using computer-executable instructions and/or can be performed in the processor control codes, e.g., codes provided on disks, carrier media of CD or DVD-ROM, programmable memory of read-only memory (firmware) or data carriers of optical or electronic signals.

The apparatus and its components of the implementation can be implemented, for example, by super large-scale integrated circuits or gate arrays, semiconductors (such as logic chips, transistors and the like), or hardware circuits of programmable hardware devices (such as field programmable gate arrays, programmable logic devices and the like), and also can be implemented by a variety of software executed by the processor or by a combination of the above hardware circuits and software, such as firmware.

Although the present invention has been described with reference to the currently conceived embodiments, it should be appreciated that the present invention is not limited to the embodiments disclosed herein. Instead, the present invention is intended to encompass various modifications and equivalent arrangements included within spirit and scope of the attached claims. The scope of the attached claims complies with the widest interpretation to contain all such modifications and functions of equivalent structures.

We claim:

1. A method for estimating causality among observed variables, comprising:
   in response to receiving observed data of mixed observed variables, determining a mixed causality objective function suitable for continuous observed variables and discrete observed variables, based on fitting inconsistency upon fitting with the observed variables and sparsity constraints on a causal network structure for the observed variables, wherein the mixed causality objective function includes a causality objective function for continuous observed variables and a causality objective function for discrete observed variables, wherein the fitting inconsistency is adjusted based on weighted factors of the observed variables, a weighted factor of an observed variable represents a lower limit of a minimum cost required for fitting an object variable using other observed variables than the observed variable, and weighted factors for the discrete observed variables are different from weighted factors for the continuous observed variables; and
   optimally solving a mixed causality objective function for the observed variables by means of a mixed sparse causal inference, which is suitable for both continuous observed variables and discrete observed variables, using the observed data under a constraint of directed acyclic graph, to estimate causality among the observed variables.

2. The method of claim 1, wherein a causality objective function for continuous observed variables is built on an assumption that errors of observed variables comply with a Laplace distributions and a causality objective function for discrete observed variables is built on an assumption that errors of observed variables comply with a logistic distribution.

3. The method of claim 1, wherein the weighted factors for continuous observed variables are calculated on an assumption that errors of observed variables comply with a Laplace distribution and the weighted factors for discrete observed variables are calculated on an assumption that errors of observed variables comply with a logistic distribution.

4. The method of claim 1, wherein the mixed sparse causal inference for the mixed causality objective function for the observed variables is converted into a problem of solving an optimal causal sequence with recursion, wherein a cost from a starting node to a current node and a predicted cost from a current node to a target node in a sorted causal sequence are determined based on fitting inconsistency adjusted by the weighted factors of the observed variables and sparsity constraints on a causal network structure for the observed variables.

5. The method of claim 1, wherein the sparsity constraint is L0 sparsity constraint.

6. The method of claim 5, further comprising, in a process of solving an optimal causal sequence recursion:
   determining, for a newly generated candidate causal sequence, whether it is in conflict with a predetermined sequential relation of variable groups; and
   if it is determined that there is a conflict, abandoning the newly generated candidate causal sequence.

7. The method of claim 6, wherein the predetermined sequential relation of variable groups is determined based on one or more of following ways:
   being given by experts in the field; or
   being automatically determined based on the observed data.

8. The method of claim 7, wherein the predetermined sequential relation of variable groups is automatically determined based on the observed data by:
   obtaining a potentially optimal parent node set for each of the observed variables;
   generating a parent relation graph based on the obtained optimal parent node set;
   extracting strongly connected components from the parent relation graph;
   converting the parent relation graph into a new directed acyclic graph by converting each component in the strongly connected components into a new node and adding a corresponding edge between respective new nodes in the presence of connectivity between two strongly connected components in the parent relation graph; and
   extracting a sequential relation between strongly connected components in the directed acyclic graph as the predetermined sequential relation of variable groups.

9. An apparatus for estimating causality among observed variables, comprising:
   a mixed objective function determination module configured to, in response to receiving observed data of mixed observed variables, determine a mixed causality objective function suitable for continuous observed variables and discrete observed variables, based on fitting inconsistency upon fitting with the observed variables and sparsity constraints on a causal network structure for the observed variables, wherein the mixed causality objective function includes a causality objective function for continuous observed variables and a causality objective function for discrete observed variables, wherein the fitting inconsistency is adjusted based on weighted factors of the observed variables, a weighted factor of an observed variables represents a lower limit of a minimum cost required for fitting an object variable using other observed variables than the observed variable, and weighted factors for the discrete observed variables are different from weighted factors for the continuous observed variables; and a mixed causal inference module configured to optimally solve a mixed causality objective function for the observed variables by means of a mixed sparse causal inference, which is suitable for both continuous observed variables and discrete observed variables, using the observed data under a constraint of directed acyclic graph, to estimate causality among the observed variables.

10. The apparatus of claim 9, wherein a causality objective function for continuous observed variables is built on an assumption that errors of observed variables comply with a Laplace distribution and a causality objective function for discrete observed variables is built on an assumption that errors of observed variables comply with a logistic distribution.

11. The apparatus of claim 9, wherein the weighted factors for continuous observed variables are calculated on an assumption that errors of observed variables comply with a Laplace distribution and the weighted factors for discrete observed variables are calculated on an assumption that errors of observed variables comply with a logistic distribution.

12. The apparatus of claim 9, wherein the mixed causal inference module is configured to convert the mixed sparse causal inference for the mixed causality objective function for the observed variables into a problem of solving an optimal causal sequence with recursion, wherein the causal inference module is configured to determine, based on fitting inconsistency adjusted by the weighted factor of the observed variables and sparsity constraints on a causal network structure for the observed variables, a cost from a starting node to a current node and a predicted cost from a current node to a target node in a sorted causal sequence.

13. The apparatus of claim 9, wherein the sparsity constraint is L0 sparsity constraint.

14. The apparatus of claim 13, further comprising a search space pruning module configured to, in a process of solving the optimal causal sequence recursion:

determine, for a newly generated candidate causal sequence, whether it is in conflict with a predetermined sequential relation of variable groups; and if it is determined that there is a conflict, abandon the newly generated candidate causal sequence.

15. The apparatus of claim 14, wherein the predetermined sequential relation of variable groups is determined based on one or more of following ways:

being given by experts in the field; or being automatically determined based on the observed data.

16. The apparatus of claim 15, further comprising a sequential relation determination module configured to automatically determine the predetermined sequential relation of variable groups by:

obtaining a potentially optimal parent node set for each of the observed variables;

generating a parent relation graph based on the obtained optimal parent node set;

extracting strongly connected components from the parent relation graph;

converting the parent relation graph into a new directed acyclic graph by converting each component in the strongly connected components into a new node and adding a corresponding edge between respective new nodes in the presence of connectivity between two strongly connected components in the parent relation graph; and extracting a sequential relation between strongly connected components in the directed acyclic graph as the predetermined sequential relation of variable groups.

17. A system for estimating causality among observed variables, comprising:

a processor; and a memory having computer program codes stored therein which, when executed by the processor, causing the processing to perform the method according to claim 1.

18. A computer-readable storage medium having computer program codes stored thereon, the computer program codes, when executed by a processor, performing the method according to claim 1.

* * * * *